Jan. 15, 1952     C. H. HONEYCUTT     2,582,869
AXIALLY COLLAPSING TYPE TIRE REMOVING HAND TOOL
Filed Nov. 21, 1946
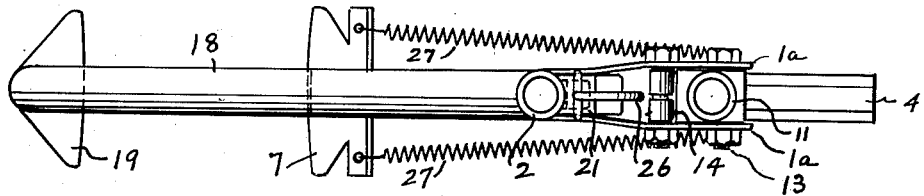
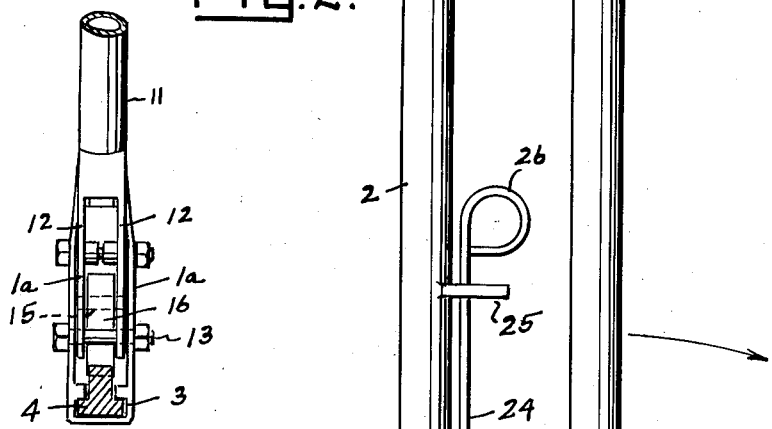
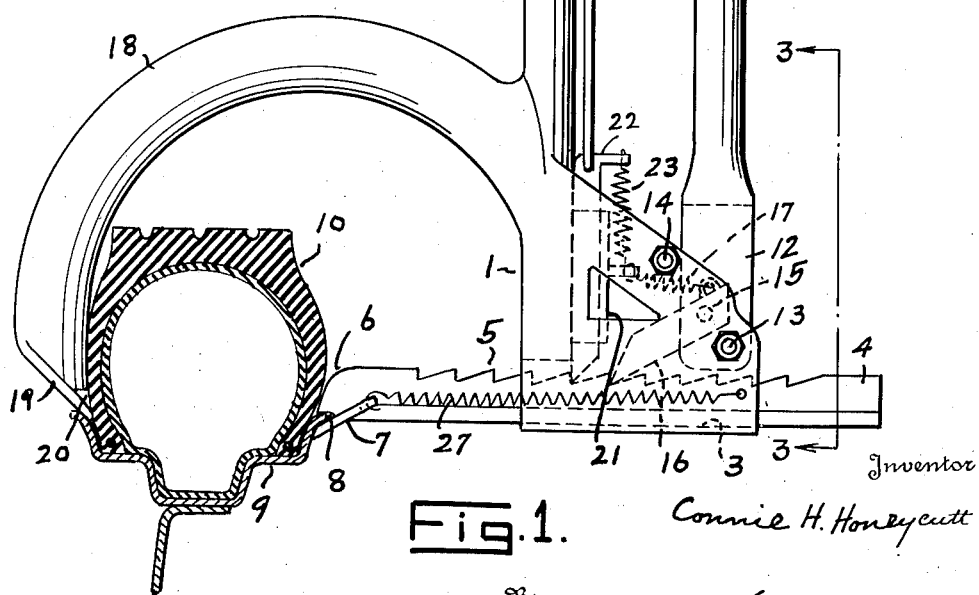
Inventor
Connie H. Honeycutt
By
E. V. Hardaway.
Attorney Patented Jan. 15, 1952

2,582,869

UNITED STATES PATENT OFFICE 2,582,869

AXIALLY COLLAPSING TYPE TIRE REMOVING HAND TOOL

Connie H. Honeycutt, Houston, Tex.

Application November 21, 1946, Serial No. 711,289

2 Claims. (Cl. 157—1.26)

This invention relates to an axially collapsing type tire removing hand tool.

An object of the present invention is to provide a tool of the character described whereby a vehicle tire may be released from the wheel rim preparatory to its removal from the rim.

It is another object of the present invention to provide a tire remover of the character described which is of such construction that it may be applied to either side of the conventional pneumatic tire so that both sides of the tire may be released from the corresponding flanges of the wheel rim.

It is another object of the present invention to provide a tire removing tool of the character described which includes a frame having a fixed handle, means carried by the frame for engaging one side of the tire and for anchoring the frame relative to the other side of the tire with an operating lever pivoted to the frame and intermediate connections between the lever and the tire engaging means for applying the required pressure to the tire to detach it from the wheel rim.

Other objects and advantages will be apparent from the following specification which is illustrated by the accompanying drawings, wherein:

Figure 1 is a side view of the tool as applied to the tire.

Figure 2 is a top plan view; and

Figure 3 is a fragmentary, sectional view taken on the line 3—3 of Figure 1.

Referring now more particularly to the drawings wherein like numerals of reference designate the same parts in each of the figures, the numeral 1 designates the frame as a whole which, in the present illustration, is shown as approximately triangular in side elevation.

Upstanding from this frame and preferably formed integrally therewith there is the handle 2.

The frame is formed with the spaced side plates 1a, 1a and the base of the frame is formed with a dovetailed track 3.

A push bar 4, dovetailed in cross-section, is mounted to move longitudinally in said track and its upper face is formed with a rack face 5 whose teeth are outwardly pitched, as shown in Figure 1.

The inner end of this bar is rounded off, as at 6, and rigidly secured to said end there is a forwardly declining clamp jaw 7 whose free margin is spaced from the corresponding end of the bar 4 to provide a space 8 for the reception of a margin of the wheel rim 9 whereon the tire 10, to be removed, is mounted.

There is an operating lever 11 whose lower end is formed with the spaced side flanges 12, 12 which fit between the side plates 1a, 1a and are pivoted on the cross bolt 13 which extends through said side plates and the flanges 12.

The lever 11 may be oscillated about the cross bolt 13 and mounted within the frame 1 in front of said lever there is a transverse stop 14 which limits the movement of the lever 11 toward the handle 2 to prevent injury to the hands of the operator.

Pivotally mounted between the side flanges 12, on the cross pin 15, there is a pawl 16. The free end of this pawl is engageable with the teeth of the rack face 5 and is maintained in such cooperating relation by a pull spring 17, one end of which is attached to the upper end of the pawl and whose other end is attached to the frame 2. Formed integrally with the frame 1 there is a curved arm 18 whose free end is formed with a relatively wide, retracted, jaw 19. The free end of this jaw is spaced beyond the free end of the arm 18 to provide a notch 20, the purpose of which will be hereinafter explained.

Within the frame 1 there is a vertical guide 21 and mounted to slide in this guide there is a dog 22 whose lower end is held in engageable relation with the rack face 5 by means of a pull spring 23 whose upper end is connected to said dog and whose lower end is connected to the frame.

Connected to the upper end of the dog 22 there is a pull rod 24 which slides through a bearing member 25 on the handle 2 and the upper end of the pull rod is formed with a grip member 26.

In operation the tool may be applied to the tire, as shown in Figure 1, with the clamp jaw 7 engaged against the adjacent side of the wheel rim 9 with the margin of said rim in the notch and with the free margin of the jaw 19 between the opposite side of the tire 10 and the remote flange of the wheel rim. The lever 11 may then be oscillated, the pawl 16 engaging successively with the teeth of the rack face 5. This will exert a pull, through the arm 18, on the remote side of the tire while the wheel rim is held stationary by the bar 4 and the frame 1 gradually moving outwardly along said bar. Upon movement of the lever 11 outwardly to take a new hold the dog 22 will engage the rack face 5 to hold the frame 1 and arm 18 against inward movement. The remote side of the tire will thus be disengaged from the rim and the wheel may be turned from time to time until that side of the tire is released all the way around.

The pull rod 24 may then be pulled upwardly to release the dog 22 and the pawl 16 may be released from the rack face 5 whereupon the frame will be pulled inwardly along the bar 4 by means of the pull springs 27, 27 which are attached, at their inner ends, to the ends of the clamp jaw 7, at their outer ends, to the frame 1. Thereupon the jaw 19 may be engaged underneath the remote flange of the wheel rim with said flange resting in the notch 20 and the clamp jaw 7 may be engaged against the adjacent side of the tire and the operation of the lever 11 repeated as above thus forcing the bar 4 inwardly against the adjacent side of the tire to release it from the wheel rim and the wheel may be turned as before and the operation repeated until the tire has been released from the rim all of the way around and may be then readily removed.

The drawings and description are illustrative merely while the broad principle of the invention will be defined by the appended claims.

What I claim is:

1. A tire removing tool comprising, a frame, an arm rigidly secured to the frame and terminating in a forwardly inclined jaw and having a rim flange receiving notch between the jaw and the adjacent end of the arm, a bar slidable in the frame and terminating in a jaw which confronts the other jaw, there being a notch between said last mentioned jaw and the adjacent end of the bar, resilient means connected to the frame and bar and urging the bar in a direction to separate the jaws, an oscillating lever pivoted to the frame, a pawl on the lever adapted to cooperate with said bar, as the lever is oscillated, to move the jaws, relatively, toward each other, a dog mounted in the frame and engageable with the bar to prevent retraction of the bar and of the jaw carried thereby.

2. A tire removing tool comprising, a frame, a curved arm rigidly secured to the frame and terminating in a forwardly inclined, laterally widened, clamp jaw, a handle upstanding from the frame, a bar slideable in the frame at substantially right angles to the handle and terminating in a jaw which confronts said other jaw, there being a notch between said last mentioned jaw and the end of the bar, an oscillating lever pivoted to the frame and in substantially the same plane as the handle, a pawl on the lever adapted to cooperate with said bar as the lever is oscillated to move the jaws, relatively, toward each other, a dog slideably mounted in the frame and engageable with the bar to prevent retraction of the bar and of the jaw carried thereby, a pull rod mounted in a bearing on the handle and pivotally connected to said dog to release the dog and a yieldable member normally holding said dog in active position.

CONNIE H. HONEYCUTT.

REFERENCES CITED

The following references are of record in the file of this patent:

UNITED STATES PATENTS

| Number | Name | Date |
|---|---|---|
| 1,066,210 | Mahon | July 1, 1913 |
| 1,093,825 | Bryant | Apr. 21, 1914 |
| 1,137,555 | Turnbull | Apr. 27, 1915 |
| 1,178,481 | Roland | Apr. 4, 1916 |
| 1,317,143 | Peterson | Sept. 23, 1919 |
| 1,330,648 | Nickle | Feb. 19, 1920 |
| 1,783,827 | Carr | Dec. 2, 1930 |
| 1,952,453 | Mueller | Mar. 27, 1934 |
| 1,983,608 | Hand | Dec. 11, 1934 |
| 2,199,162 | Oliva | Apr. 30, 1940 |